United States Patent
Kothandaraman et al.

(10) Patent No.: US 12,264,604 B2
(45) Date of Patent: Apr. 1, 2025

(54) MAINTAINING OIL PRESSURE DURING CYLINDER DEACTIVATION OPERATION

(71) Applicant: Cummins Inc., Columbus, IN (US)

(72) Inventors: Govindarajan Kothandaraman, Columbus, IN (US); Lyle E. Kocher, Whiteland, IN (US); David M. Barnes, Columbus, IN (US); Scott Robert Bardakjy, Columbus, IN (US); J. Steven Kolhouse, Columbus, IN (US)

(73) Assignee: Cummins Inc., Columbus, IN (US)

( * ) Notice: Subject to any disclaimer, the term of this patent is extended or adjusted under 35 U.S.C. 154(b) by 270 days.

(21) Appl. No.: 17/884,546

(22) Filed: Aug. 9, 2022

(65) Prior Publication Data

US 2022/0381166 A1    Dec. 1, 2022

Related U.S. Application Data

(63) Continuation of application No. PCT/US2021/016777, filed on Feb. 5, 2021.

(Continued)

(51) Int. Cl.
| | |
|---|---|
| *F01L 13/00* | (2006.01) |
| *B01D 35/00* | (2006.01) |
| *F01M 1/02* | (2006.01) |
| *F01M 1/10* | (2006.01) |
| *F01M 1/16* | (2006.01) |

(Continued)

(52) U.S. Cl.
CPC ........ *F01L 13/0005* (2013.01); *B01D 35/005* (2013.01); *F01M 1/02* (2013.01); *F01M 1/10* (2013.01); *F01M 1/16* (2013.01); *F01M 5/002* (2013.01); *F01P 3/06* (2013.01); *F01L 2013/001* (2013.01);

(Continued)

(58) Field of Classification Search
CPC ............ F01L 13/0005; F01L 2013/001; B01D 35/005; F01M 1/02; F01M 1/10; F01M 1/16; F01M 5/002; F01M 2001/0215; F01M 2001/0261; F01P 3/06; F01P 2003/006

See application file for complete search history.

(56) References Cited

U.S. PATENT DOCUMENTS

| 6,557,518 B1 | 5/2003 | Albertson et al. |
| 2004/0244744 A1 | 12/2004 | Falkowski et al. |

(Continued)

FOREIGN PATENT DOCUMENTS

| CN | 103628988 A | 3/2014 |
| CN | 103946530 A | 7/2014 |

(Continued)

OTHER PUBLICATIONS

International Preliminary Report on Patentability; European Patent Office; International Patent Application No. PCT/US2021/016777; Sep. 1, 2022; 10 pages.

(Continued)

*Primary Examiner* — Jacob M Amick
(74) *Attorney, Agent, or Firm* — Taft Stettinius & Hollister LLP

(57) ABSTRACT

Systems, devices, and methods are disclosed that during cylinder deactivation, including skipfire, at low engines speeds and low engine loads maintain adequate oil pressure of valvetrain components or hardware required for CDA and/or skipfire operation.

24 Claims, 11 Drawing Sheets

Related U.S. Application Data

(60) Provisional application No. 62/979,690, filed on Feb. 21, 2020.

(51) Int. Cl.
    *F01M 5/00*  (2006.01)
    *F01P 3/06*  (2006.01)
    *F01P 3/00*  (2006.01)

(52) U.S. Cl.
    CPC .............. *F01M 2001/0215* (2013.01); *F01M 2001/0261* (2013.01); *F01P 2003/006* (2013.01)

(56) References Cited

U.S. PATENT DOCUMENTS

| | | | |
|---|---|---|---|
| 2010/0126460 A1* | 5/2010 | Lee | F04B 53/18 |
| | | | 123/196 R |
| 2014/0053802 A1 | 2/2014 | Rayl | |
| 2015/0275710 A1 | 10/2015 | Takahata et al. | |
| 2017/0356373 A1 | 12/2017 | Willard et al. | |
| 2020/0018197 A1* | 1/2020 | McCarthy, Jr. | F02D 41/0087 |

FOREIGN PATENT DOCUMENTS

| | | |
|---|---|---|
| CN | 104948250 A | 9/2015 |
| CN | 107489545 A | 12/2017 |
| CN | 108699975 A | 10/2018 |
| CN | 110402327 A | 11/2019 |
| DE | 102017003553 A1 | 10/2018 |
| EP | 3150811 A1 | 4/2017 |
| EP | 3581778 A1 | 12/2019 |

OTHER PUBLICATIONS

International Search Report; European Patent Office; International Patent Application No. PCT/US2021/016777; May 10, 2021; 5 pages.

Written Opinion of the International Searching Authority; European Patent Office; International Patent Application No. PCT/US2021/016777; May 10, 2021; 9 pages.

Chinese Search Report; National Intellectual Property Administration, P. R. China; Chinese Patent Application No. 202180015773.5; Sep. 3, 2024; 5 pages.

Chinese First Office Action; National Intellectual Property Administration, P. R. China; Chinese Patent Application No. 202180015773.5; Sep. 4, 2024; 7 pages.

* cited by examiner

MAINTAINING OIL PRESSURE DURING CYLINDER DEACTIVATION OPERATION

CROSS-REFERENCE TO RELATED APPLICATIONS

The present application is a continuation of International PCT Application No. PCT/US2021/016777 filed on Feb. 5, 2021, which claims the benefit of the filing date of U.S. Provisional Application No. 62/979,690 filed on Feb. 21, 2020, the contents of each application is incorporated herein by reference in their entirety.

BACKGROUND

This disclosure relates generally to internal combustion engine operation, and more particularly to systems and methods to maintain adequate oil pressure to the valvetrain components of the internal combustion engine during cylinder deactivation (CDA) and skipfire operations at low engine speeds and low engine loads.

Oil may be pumped throughout an engine to lubricate engine components. In addition, oil may be used in the engine as a motive power medium to actuate various devices within the engine. For example, an engine may include a valvetrain that includes valve components that may be selectively deactivated by supplying pressurized oil to the valve components for valve operation. The valve operation may include cylinder deactivation, variable valve timing, variable valve actuation, engine braking, or other such valvetrain functions. The valvetrain may include, for example, crossheads, tappets, cam bushings, rocker arms, and other valvetrain components that may be engaged for the valve operation. Moreover, the engine may also include piston cooling nozzles or jets that spray oil on engine pistons to cool the engine pistons. An oil pump may pump oil throughout the engine and an oil pump output pressure may be increased via increasing a displacement of the oil pump. However, if the oil pump is operated at too high of a pressure, the engine fuel consumption may degrade. Conversely, if the oil pump is operated at too low of a pressure, the engine and engine components may not be sufficiently lubricated and may not operate as expected.

At low engine speeds and low engine loads, maintaining adequate oil pressure for the valvetrain components required for cylinder de-activation is difficult. Therefore, it would be desirable to provide a way of controlling oil pressure such that the valvetrain components supplied oil by the oil pump operate as desired while maintaining a low engine speed and/or a low engine load during CDA and skipfire operations.

SUMMARY

Unique aspects of this disclosure include multiple techniques that may be employed individually or in combination to use cylinder deactivation (CDA), potentially including skip fire, at low engine speeds and low engine loads while maintaining adequate oil pressure of the valvetrain components or hardware required for CDA and/or skipfire operations.

Some general techniques employed to solve this problem include (1) system level enhancements, (2) controlling oil flow with a single pump arrangement, (3) an auxiliary pressure source, and (4) other systems not relying on hydraulics.

System level enhancements include a low restriction path to a main oil rifle to the cylinder head such that the oil flow bypasses a lube filter or a lube cooler. Bypassing the lube filter or lube cooler removes a restriction to increase the oil pressure at the valvetrain without requiring an increase in the pump outlet pressure. Another system level enhancement includes increasing an entire lube system pressure. Yet another system level enhancement includes lowering oil flow rates to certain oil lubricated components while increasing oil flow rates to other oil lubricated components.

Controlling oil pressure and flow with a single pump arrangement includes one or more of an electric oil pump, a variable flow oil pump, one or more piston cooling nozzles (PCN) that include a check valve to allow oil flow above a certain inlet pressure, and/or an electronically controlled oil control valve to shut off oil flow to the piston cooling nozzles. For example, the speed of the electric oil pump can be based upon a number of active cylinders. This speed setting can be determined with a look-up in pre-calibrated tables or models that correlate the number of cylinders firing to oil pump speed.

Alternatively to controlling the electric oil pump to a control speed setting, an oil pressure sensor can be placed at an output location of the electric oil pump, and the electric oil pump can be controlled to a target oil pressure. The target oil pressure can be determined as a function of the number of cylinders firing from pre-calibrated look-up tables or models. Multiple discrete oil pressure switches that turn "on" at different oil pressures could be used in place of an oil pressure sensor. For example, if "n" cylinders are firing, i.e., not deactivated, then one oil pressure switch is on. As another example, if "n+1" cylinders are firing, then two oil pressure switches are "on" or activated to provide a higher oil pressure than when only "n" cylinders are firing.

In another example, if CDA is operated in a way that fixed cylinders are de-activated, i.e., no skip fire, then the piston cooling nozzles can be turned "off" for the de-activated cylinders. When the CDA is active during low engine speed and/or low engine load, the piston cooling nozzles to all of the cylinders can be turned or switched off to reduce an average oil flow through all the piston cooling nozzles using a variable PCN. The reduced flow of oil through the PCN enables more oil pressure for the valvetrain components during CDA. Alternatively or additionally, a variable flow valve can be added to direct flow between PCN's and CDA hardware. At low engine speeds and low engine loads, if CDA is active, then more oil flow can be diverted from the PCN's to the valvetrain components.

An auxiliary pressure source can include an additional or secondary booster pump to provide additional oil pressure to the cylinder head, a clutched oil pump, a build-up or reservoir of high oil pressure, and/or a cam lobe design that creates a pumping chamber.

Other systems are also contemplated that do not rely on hydraulics, and may include electromagnetic systems, purely mechanical systems without electronic control such as latches, and a linear motor.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF REPRESENTATIVE EMBODIMENTS

Figure 1:
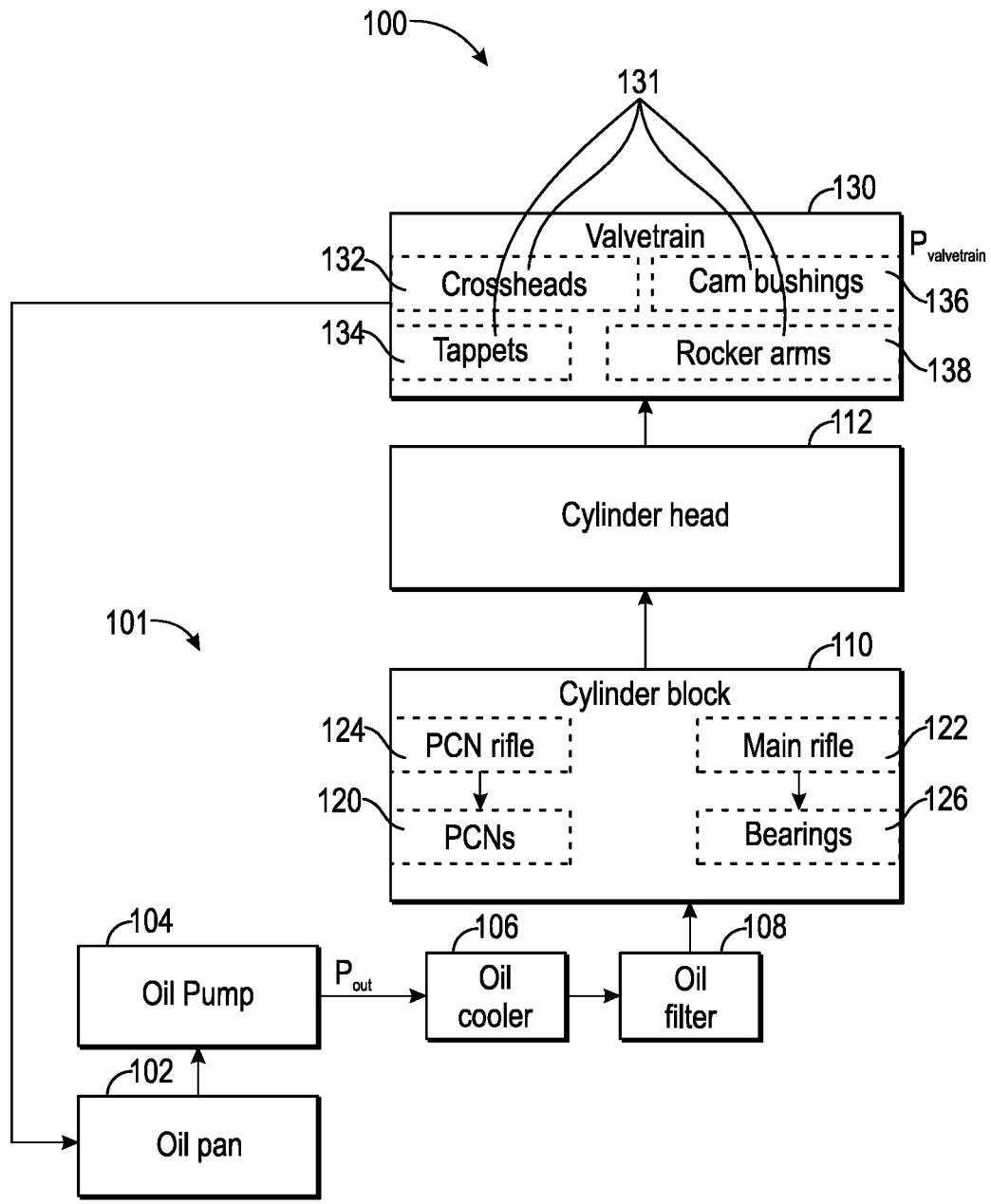
FIG. 1 illustrates a schematic depiction of a prior art lube system of an internal combustion engine.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

Illustrated in FIG. 1 is an example of a typical prior art first lube system 101 of an internal combustion engine 100. The illustration of the first lube system 101 is not intended to show every oil connection and path between all of the components of the engine 100. The engine 100 includes an oil sump or pan 102 structured to hold an amount of oil that can lubricate all of components of the first lube system 101. The oil pan 102 is configured to receive and collect the oil as a reservoir. The engine 100 includes an oil pump 104 that is fluidly connected to the oil pan 102 wherein the oil pump 104 forces oil under pressure out of the oil pump 104 as illustrated as Initial Pressure Out $P_{out}$. The engine 100 also includes a heat exchanger or an oil cooler 106 that is fluidly connected to the oil pump 104. The oil cooler 106 is configured to receive the oil from the oil pump 104 at a first temperature and cool the oil to a lower or second temperature by heat dissipation. The oil cooler 106 is also configured to receive the oil at the Initial Pressure Out $P_{out}$. The engine 100 includes an oil filter 108 that is fluidly connected to the oil cooler 106 that is configured to receive the oil from the oil cooler 106 and remove particulate matter from the oil.

The engine 100 includes a cylinder or engine block 110 and a cylinder head casting 112 attached thereto. The cylinder block 110 can include one or more cylinders, cylinder sleeves (not illustrated), and coolant passages therein. In the illustrated embodiment, the cylinder or engine block 110 represents a single cylinder that includes a piston cooling nozzle (PCN) 120, a main oil rifle 122 configured to deliver oil to the at least one cylinder of the engine, and a piston cooling nozzle rifle 124 that receives oil for directing the oil to the PCN 120, causing the oil delivered to the at least one cylinder of the engine 100 to lower a temperature of the piston (not pictured). In other embodiments, the PCN 120 can be disposed inside the main oil rifle 122. The cylinder or engine block 110 also includes bearings 126 which can include main or rod bearings fluidly connected to the main oil rifle 122. The cylinder or engine block 110 is fluidly connected to the oil filter 108.

The engine 100 includes a valvetrain 130 that includes a plurality of valvetrain components 131 such as valves, rocker arms, pushrods, lifters, and camshaft(s). These valvetrain components can be selectively deactivated by supplying pressurized oil to the valvetrain 130 via the engine oil circuit 101. The valvetrain 130 can include several configurations, each of which varies slightly in layout but still performs the task of opening and closing the valves at the time necessary for proper operation of the engine 100. One embodiment of the valvetrain 130 is illustrated in FIG. 1 that includes one or more valvetrain components 131. These valvetrain components 131 can include one or more of crossheads 132, tappets 134, cam bushings 136, and rocker arms 138, and other components not illustrated. One or more of the valvetrain components 131 shown in the valvetrain 130 may be engaged, disengaged, activated, and/or deactivated for cylinder deactivation of one or more cylinder of engine 100. The illustrated embodiment is not intended to be exhaustive of all valvetrain components 131 that could be included in the valvetrain 130. The valvetrain 130 receives the pressurized oil from the cylinder head casting 112 and the cylinder block 110.

Other oil connections and paths throughout the engine 100 are also contemplated, and those that are shown are merely representative. For example, turbocharger bearings are lubricated by oil but the turbocharger is not shown but could be included. As another example, oil flow from all components including the PCN 120 returns to the oil pan 102, but those connections are not shown for simplicity. This disclaimer is also applicable to the discussion of the various aspects of the present disclosure presented in FIGS. 2-13, which may also include other components and connections, and also do not show every component of the engine for which the present disclosure can improve the function.

A controller (not illustrated) can be operatively connected to the engines and lube systems discussed hereinbelow in FIGS. 2-13. The controller can be a conventional microcomputer including: a microprocessor unit, input/output ports, read-only memory (e.g., non-transitory memory), random access memory, keep alive memory, and a conventional data bus. The controller can receive various signals from sensors coupled to or associated with engines and lube systems, including, for example: position sensor(s) that detect force or position of an accelerator pedal, brake pedal, or other component; intake, exhaust, oil, and/or associated with coolant sensors for temperature and/or pressure, engine speed sensors, fuel sensors, etc. Barometric pressure may also be sensed (sensor not shown) for processing by the controller. The controller may also receive information from other sensors which may include but are not limited to engine oil pressure sensors, ambient pressure sensors, and engine oil temperature sensors. The controller can be configured with hardware and/or instructions encoded on a computer readable medium such that the controller controls one or more components to perform the operations and/or functions described herein in response to one or more inputs from the sensor(s).

Figure 2:
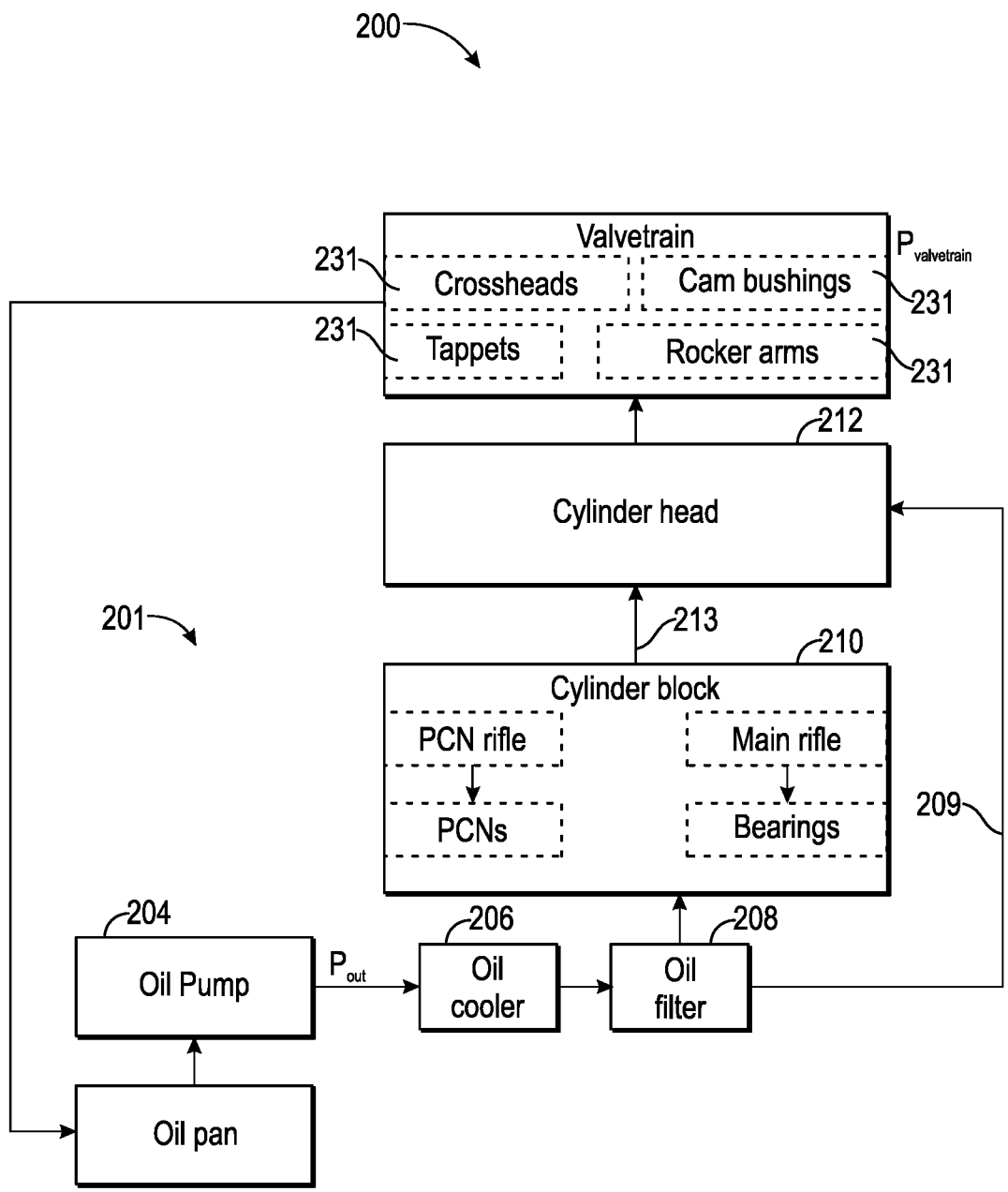
FIG. 2 illustrates a schematic depiction of one embodiment lube system of an internal combustion engine according to the present disclosure.

Illustrated in FIG. 2 is a first embodiment of a lube system 201 of an internal combustion engine 200 according to the present disclosure. The lube system 201 and the engine 200 may include components like the first lube system 101 and the engine 100, but lube system 200 is configured to improve and maintain adequate oil pressure to one or more of the valvetrain components 231 via a low restriction flow path 209 to the cylinder head 212 from the oil filter 208. In an embodiment, the oil flow path 209 can bypass an oil cooler 206 and/or oil filter 208. Flow path 209 removes the cylinder block 210 from the oil flow path, reducing oil pressure drop from an oil pump 204 to the cylinder head 212 to thereby increase the valvetrain oil pressure $P_{valvetrain}$ desired to actuate the valvetrain components 231 at low engine speeds during CDA and/or skipfire operation. An oil flow path 213 between the cylinder head 212 and a cylinder block 210 may or may not be present in this embodiment.

Figure 3:
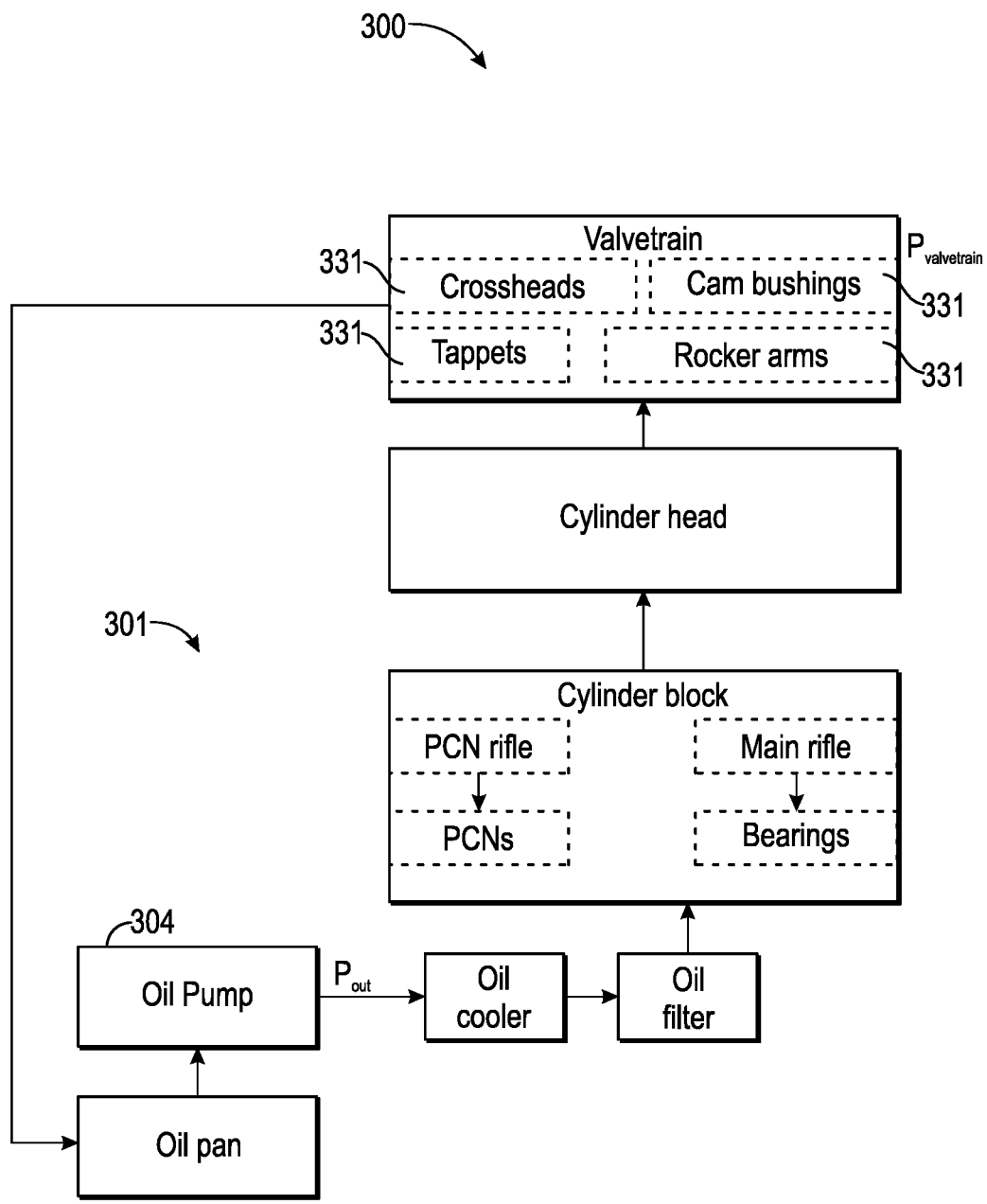
FIG. 3 illustrates a schematic depiction of one embodiment lube system of an internal combustion engine according to the present disclosure.

Illustrated in FIG. 3 is a second embodiment of a lube system 301 of an internal combustion engine 300 according to the present disclosure. The lube system 301 and the engine 300 may include components like the first lube system 101 and the engine 100, but engine 300 includes an oil pump 304 that has a larger pressure output capability than oil pump 104. Therefore, oil pump 304 increases the entire or overall lube system pressure of the third lube system 301 as compared to first lube system 101. Some examples of the oil pump 304 include a fixed displacement pump or other types of pumps. The Initial Pressure Out $P_{out}$ is increased in response to a command from the controller so that the valvetrain oil pressure $P_{valvetrain}$ increases at valvetrain 331 during low engine speeds during CDA and/or skipfire operations.

Figure 4:
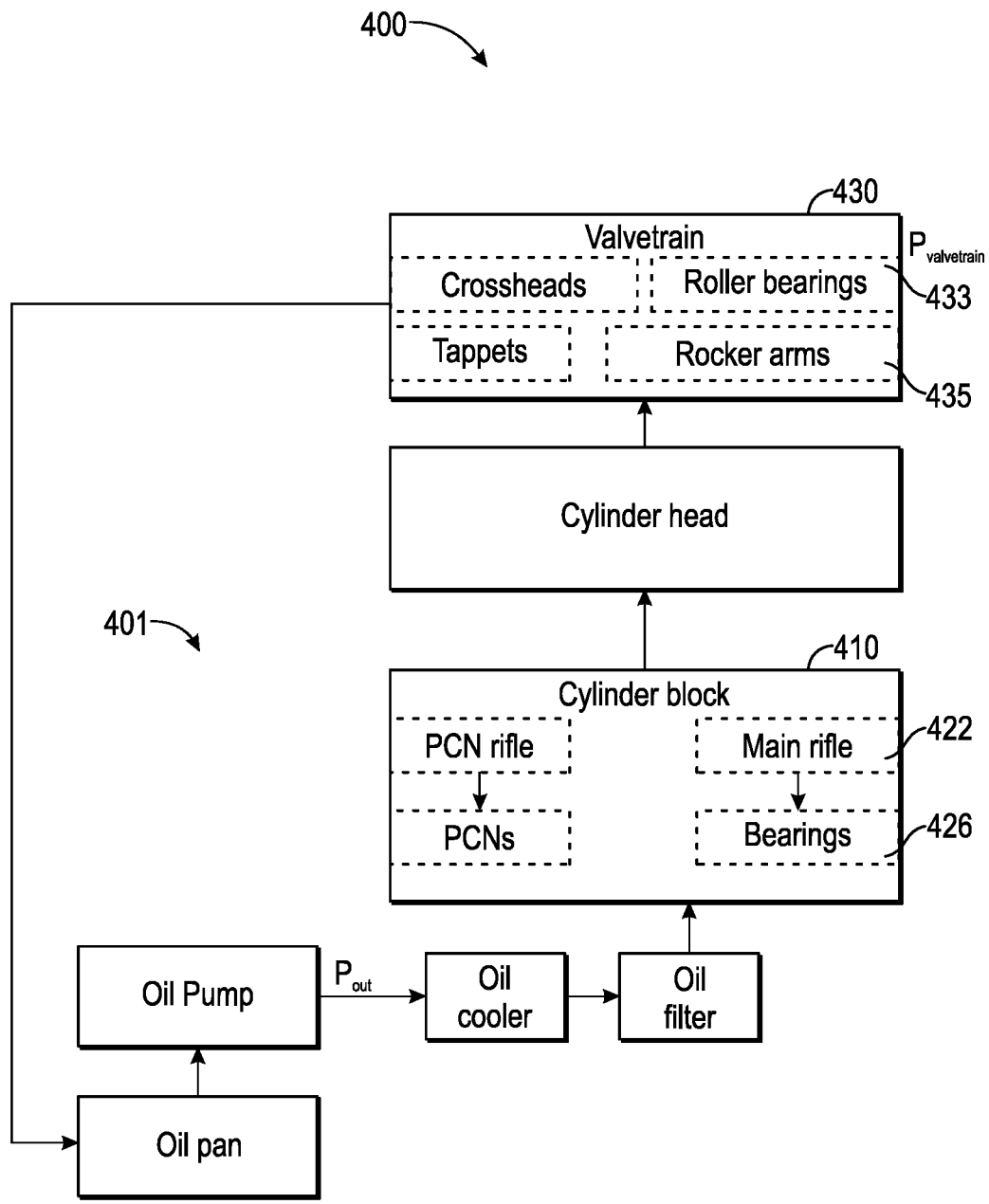
FIG. 4 illustrates a schematic depiction of one embodiment lube system of an internal combustion engine according to the present disclosure.

Illustrated in FIG. 4 is a third embodiment of a lube system 401 of an internal combustion engine 400 that provides lower oil flow rates to some components of the engine 400 so that oil flow to valvetrain components may be increased. The lube system 401 and the engine 400 may include a cylinder or engine block 410 is substantially similar to the cylinder block 110, but the bearings 426 lubricated by oil from main rifle 422 can be match fit bearings and require less oil flow than bearings 126. Additionally or alternatively, the valvetrain 430 includes roller bearings 433 that are fluidly connected to rocker arms 435 and replace the cam bushings in the valvetrain 130. The bearings 426 and/or roller bearings 433 enable lower oil flow rates thereby increasing the available valvetrain oil pressure $P_{valvetrain}$ required to actuate the valvetrain components of valvetrain 430 at low engine speeds during CDA and/or skipfire operations.

Figure 5:
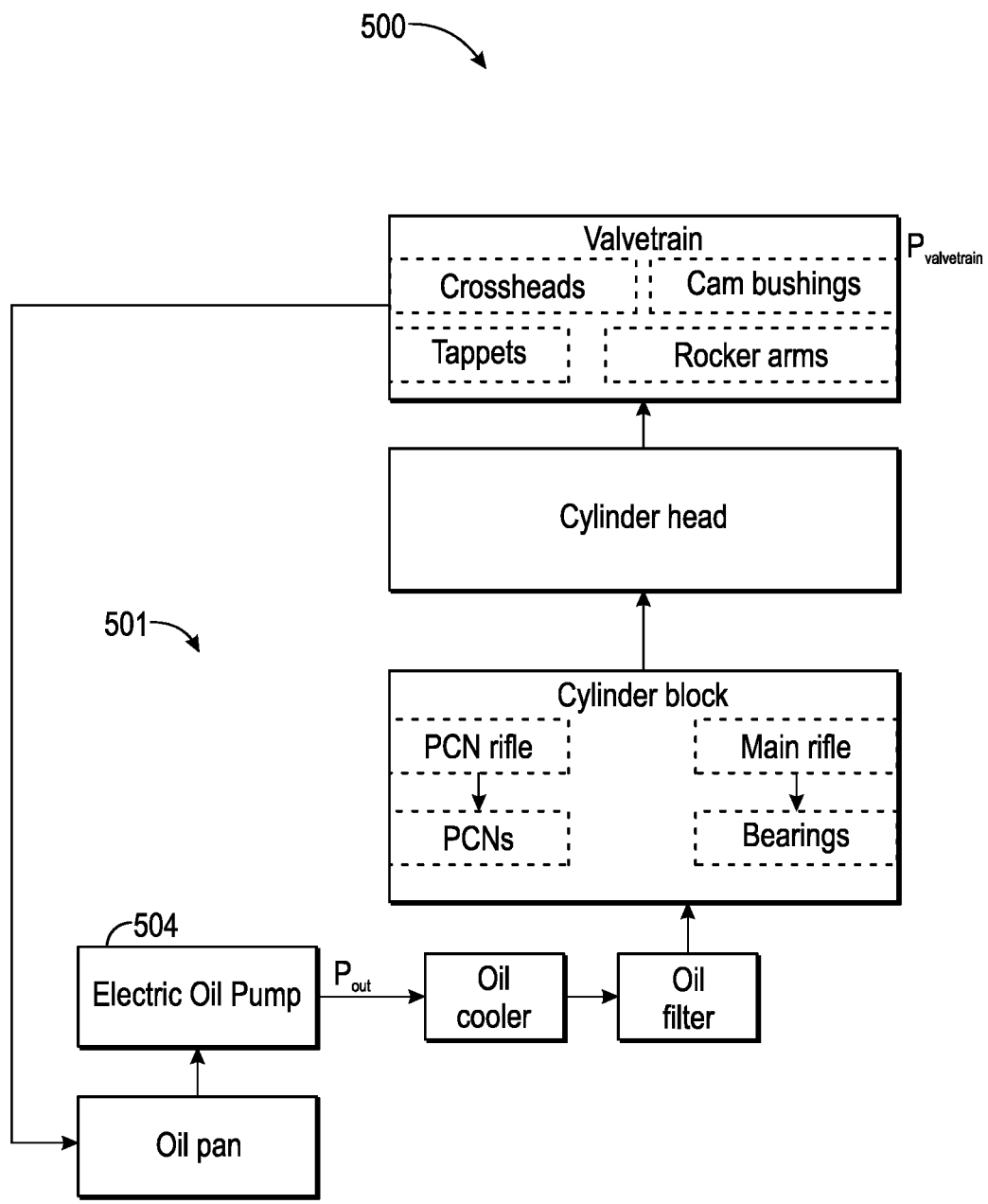
FIG. 5 illustrates a schematic depiction of one embodiment lube system of an internal combustion engine according to the present disclosure.

Illustrated in FIG. 5 is a fourth embodiment of a lube system 501 of an internal combustion engine 500 according to the present disclosure. The lube system 501 and the engine 500 may include components like the first lube system 101 and the engine 100, but engine 500 includes an electric oil pump 504 that can be operated by the controller. The electric oil pump 504 decouples the pump flow from engine speed, thereby allowing Initial Pressure Out $P_{out}$ to be increased at low engine speeds and the valvetrain oil pressure $P_{valvetrain}$ to increase. One control technique can include setting the speed of the electric oil pump 504 based upon the number of active cylinders (i.e. cylinders firing and/or not deactivated). This speed control could be determined through pre-calibrated tables or models that correlate the number of cylinders firing to oil pump speed.

Figure 6:
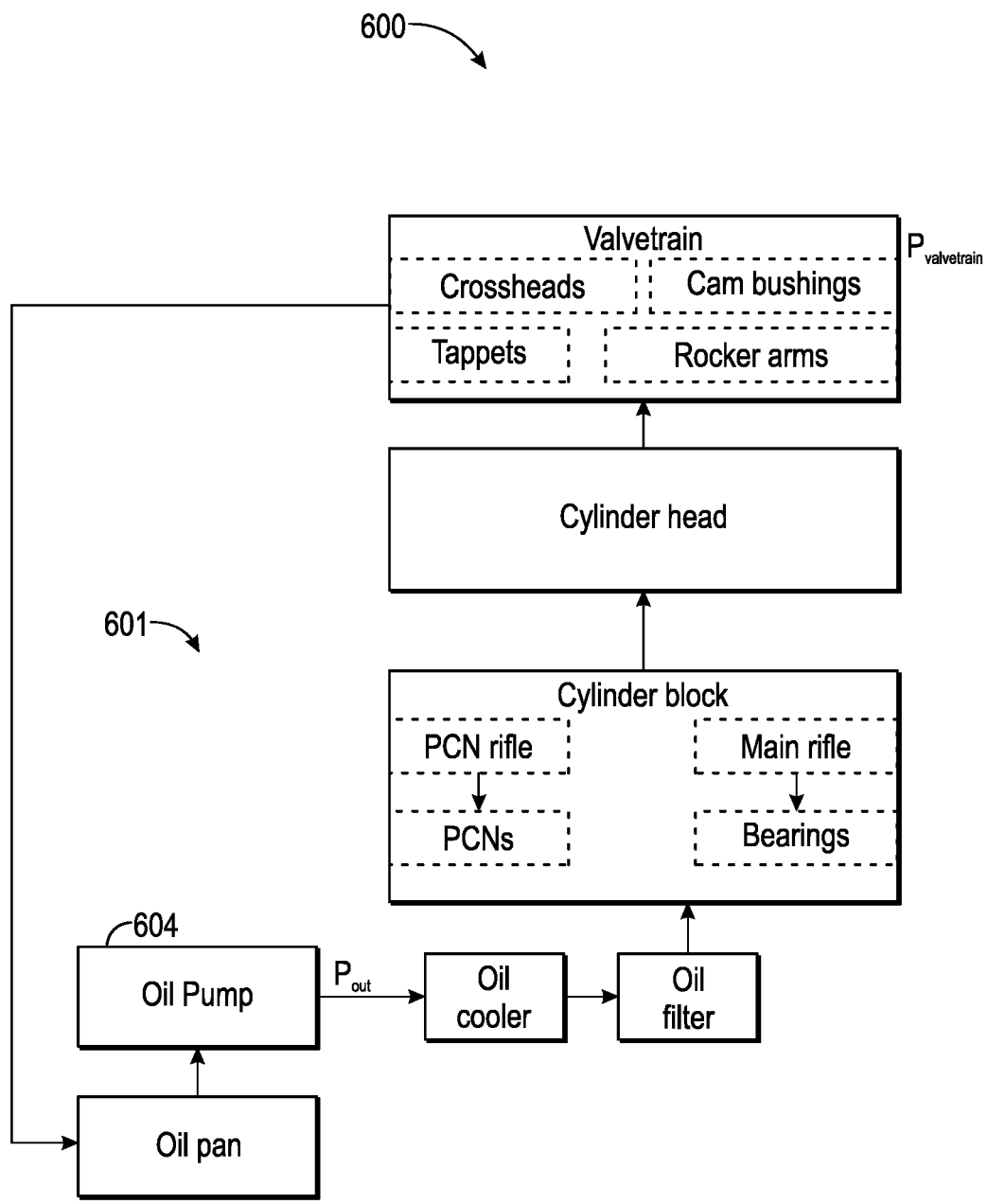
FIG. 6 illustrates a schematic depiction of one embodiment lube system of an internal combustion engine according to the present disclosure.

Illustrated in FIG. 6 is a fifth embodiment of a lube system 601 of an internal combustion engine 600. The lube system 601 and the engine 600 may include components like the first lube system 101 and the engine 100, but engine 600 includes a variable flow oil pump 604 that can be operated by the controller, and is oversized relative to normal/nominal engine needs or requirements of the engine 600 to thereby increase Initial Pressure Out $P_{out}$ at low engine speeds. Then, at higher engine speeds, where the oil flow would be excessive, the pump displacement is reduced to decrease the Initial Pressure Out $P_{out}$. The variable flow oil pump 604 results in a more efficient pump operation because the variable flow oil pump 604 only provides as much flow as is needed at higher speeds.

There are several unique ways to control these components to overcome the oil pressure challenge for CDA and/or skipfire operations at low engine speed and low load. A first technique includes setting the displacement of the variable flow oil pump 604 based upon the number of active cylinders (i.e. cylinders firing and/or not deactivated). This output control could be through pre-calibrated tables or models that correlate the number of cylinders firing to oil pump displacement. One variation of this technique includes, instead of controlling the variable flow oil pump 604 in response to an engine speed, an oil pressure sensor is placed at the output of the variable flow oil pump. The variable flow oil pump 604 can be controlled to a target oil pressure based on the oil pressure sensor. The target oil pressure can be determined as a function of the number of cylinders firing using pre-calibrated tables or models. In one form, multiple discrete oil pressure switches (that turn on at a different pressures), could be used in place of an oil pressure sensor. For example, if "n" cylinders are firing (i.e. not deactivated), then one oil pressure switch is turned on. If "n+1" cylinders are firing, then two oil pressure switches are turned on (i.e. higher pressure than when only "n" number of cylinders is firing) to provide additional oil flow for actuation of the active cylinders.

In another embodiment, during CDA operations in which fixed cylinders are de-activated (i.e. not skipfired), then the piston cooling nozzles (PCN) can be turned off for the de-activated cylinders, as discussed in more detail below with respect to FIG. 7. In this embodiment, when CDA is active during low engine speed and/or low engine load, the piston cooling nozzles can be switched off to all cylinders, or the average flow can be reduced flow through all piston cooling nozzles (using a variable flow PCN). The reduced flow of oil through the PCN's permits more oil pressure to be available for CDA. In another embodiment, a variable flow valve can be added to direct flow between the PCNs and the CDA hardware. If the CDA is active, more oil flow can be diverted to the valvetrain for CDA operation at low engine speed and low engine load.

Figure 7:
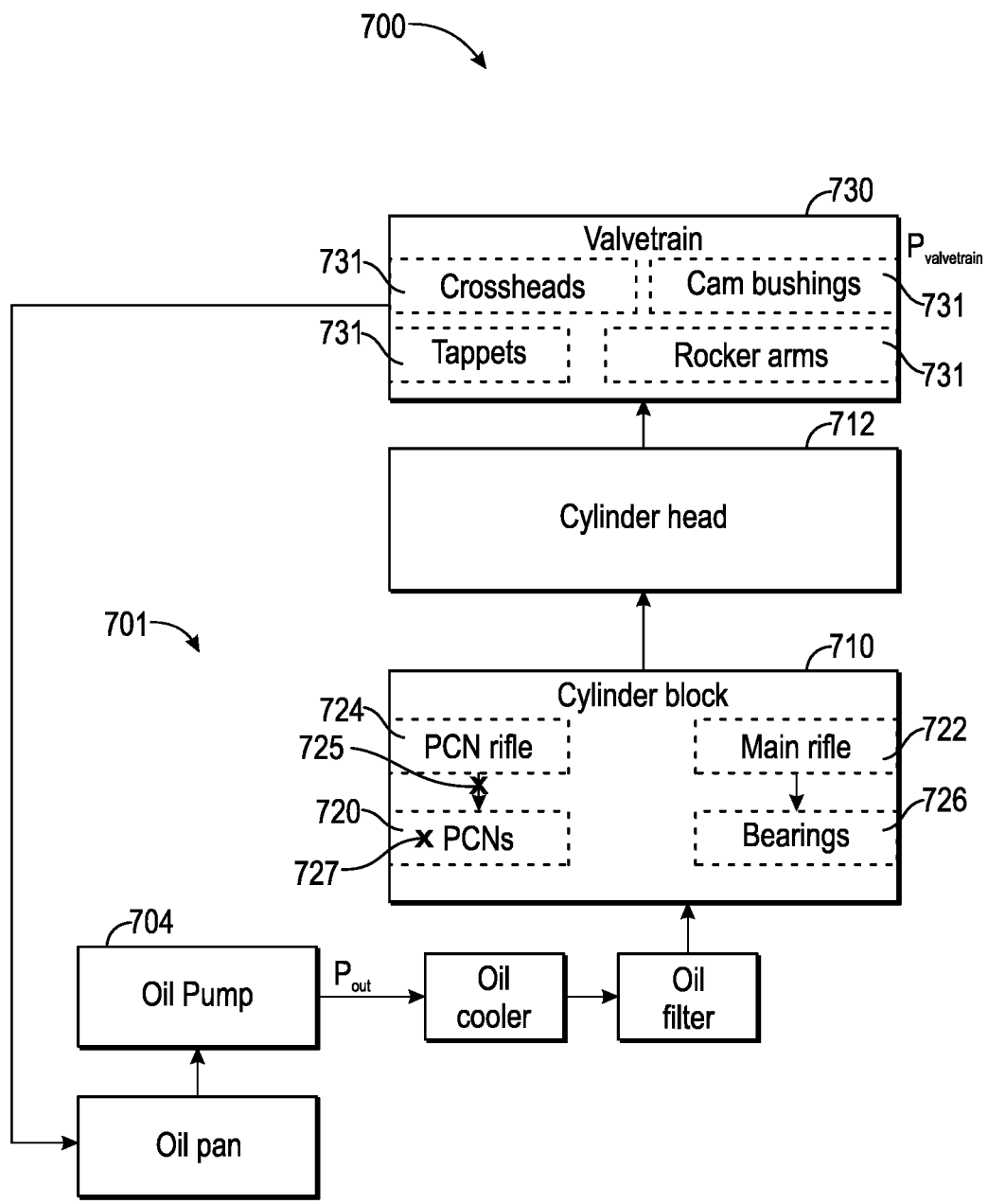
FIG. 7 illustrates a schematic depiction of one embodiment lube system of an internal combustion engine according to the present disclosure.

Illustrated in FIG. 7 is a sixth embodiment of a lube system 701 of an internal combustion engine 700 according to the present disclosure. The lube system 701 and the engine 700 may include components like the first lube system 101 and the engine 100 except as otherwise discussed herein. The engine 700 includes a cylinder or engine block 710 and a cylinder head casting 712 attached thereto. The cylinder block 710 can include one or more cylinders, cylinder sleeves (not illustrated), and coolant passages therein. In the illustrated embodiment, the cylinder or engine block 710 represents a single cylinder that includes a piston cooling nozzle (PCN) 720, a main oil rifle 722 configured to deliver oil to the at least one cylinder of the engine, and a piston cooling nozzle rifle 724 that is for directing the oil to the PCN 720, causing the oil delivered to the at least one cylinder of the engine 700 to lower a temperature of the piston. In other embodiments, the PCN 720 can be disposed inside the main oil rifle 722. The cylinder or engine block 710 also includes bearings 726 fluidly connected to the main oil rifle 722. The cylinder or engine block 710 is fluidly connected to the oil filter 708.

One or more of the PCN's 720 can include a pressure responsive flow control valve 725 to only allow oil flow above a certain inlet pressure of the PCN 720. Since Initial Pressure Out $P_{out}$ at oil pump 704 is tied to engine speed, using a checked or pressure-responsive PCN 720 would allow all of the PCN's 720 to shut off at the lower speeds (and typically relatively low loads, depending on the shape of the torque curve) where the PCN's 720 are not needed, thereby saving oil flow that can be supplied to valvetrain 730 and components 731. Additionally or alternatively to the one or more PCN's 720 having a pressure responsive flow control valve 725, an electronically controlled oil control valve 727 can be used to shut off all oil flow to the PCNs 720. The electronically controlled oil control valve 727 has the added benefit of being able to flow oil to the pistons (not illustrated) when the pistons are hot and need cooling, even if engine speed and Initial Pressure Out $P_{out}$ is low. A benefit of the flow control valve 725 and the electronically controlled oil control valve 727 is that they increase oil flow rates to the valvetrain components 731 for CDA and/or skipfire operations at low engine speeds.

Figure 8:
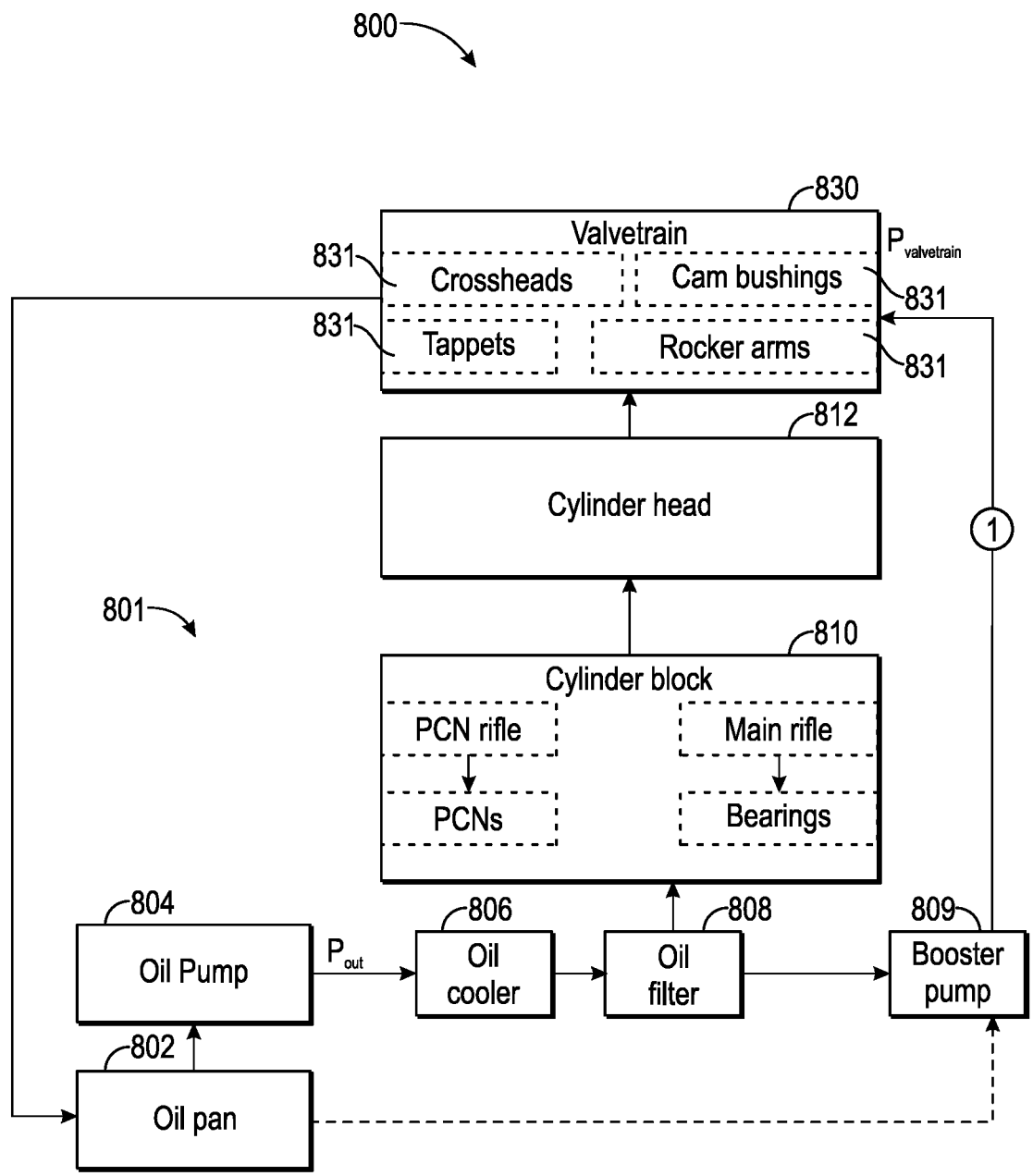
FIG. 8 illustrates a schematic depiction of one embodiment lube system of an internal combustion engine according to the present disclosure.

Illustrated in FIG. 8 is a seventh embodiment lube system 801 of an internal combustion engine 800 according to the present disclosure. The lube system 801 and the engine 800 can include components like the first lube system 101 and the engine 100 except as otherwise discussed. The engine 800 includes an oil sump or pan 802 structured to hold an amount of oil that can lubricate all of the components of the lube system 801. The oil pan 802 is configured to receive and collect the oil as a reservoir. The engine 800 includes an oil pump 804 that is fluidly connected to the oil pan 802, and the oil pump 804 can operate to force oil under pressure out of the oil pump 804 as illustrated as Initial Pressure Out $P_{out}$. The engine 800 also includes a heat exchanger or an oil cooler 806 that is fluidly connected to the oil pump 804. The oil cooler 806 is configured to receive the oil from the oil pump 804 at a first temperature and cool the oil to a lower or second temperature by heat dissipation. The oil cooler 806 is also configured to receive the oil at the Initial Pressure Out $P_{out}$. The engine 800 includes an oil filter 808 that is configured to remove particulate matter from the oil.

In a first embodiment, the engine 800 includes a booster pump 809 that is operated by the controller and that is fluidly connected to the oil filter 808. The booster pump 809 is configured to provide additional or extra oil pressure to a cylinder head 812 and/or the valvetrain components 831. The booster pump 809 is a secondary pump such as an electric pump that is engaged when additional oil pressure is needed for the valvetrain components 831. The booster pump 809 can be turned on or engaged to supply extra oil pressure to the cylinder head 812 and the valvetrain components 831. The booster pump 809 can be turned on or off depending on the engine operating condition. In a second embodiment, if the oil used to actuate the valvetrain components 831 does not require filtered oil, then the booster pump 809 could receive the oil flow directly from the oil pan 802 as illustrated by the dashed line in FIG. 8. The booster pump 809 can be located outside the head, block and valvetrain components.

Alternative embodiments of lube systems of internal combustion engines can create sufficient oil pressure for actuation of valvetrain components during CDA and/or skipfire operations. One embodiment includes a clutched oil pump. Yet other embodiments such as in FIGS. 9-13 include using a local pump incorporated into the head and/or valvetrain components to build up a reservoir of higher pressure to be used at lower engine speeds, such as with an orifice accumulator. One consideration in such embodiments is that energy is not wasted with this "local pump" when it is not needed, such as when the pressure in the system is already high enough and it does not require a local pumping event.

Figure 12:
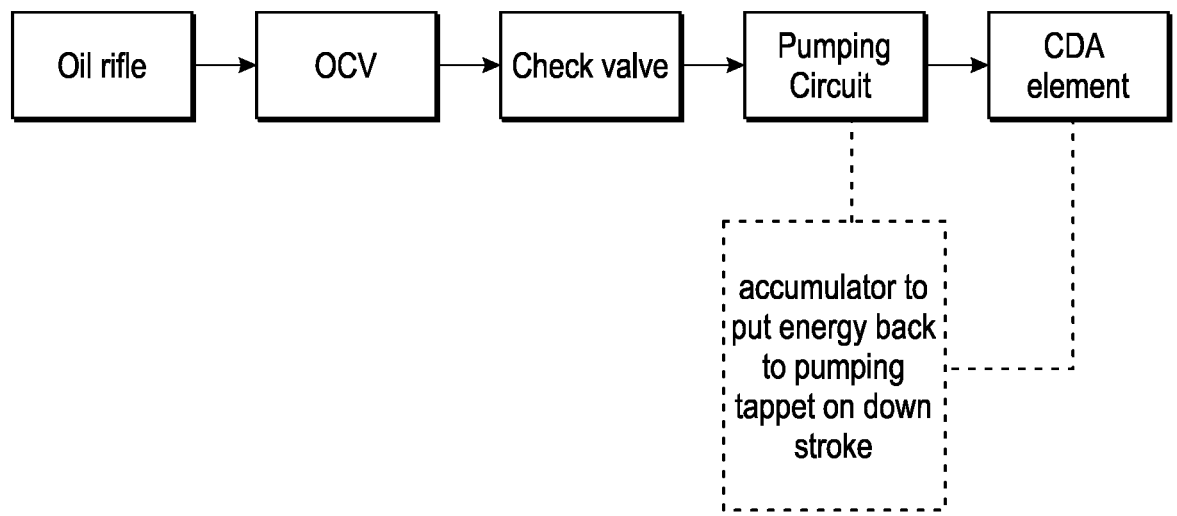
FIG. 12 illustrates a schematic depiction of one embodiment lube system of an internal combustion engine according to the present disclosure.
Figure 13:
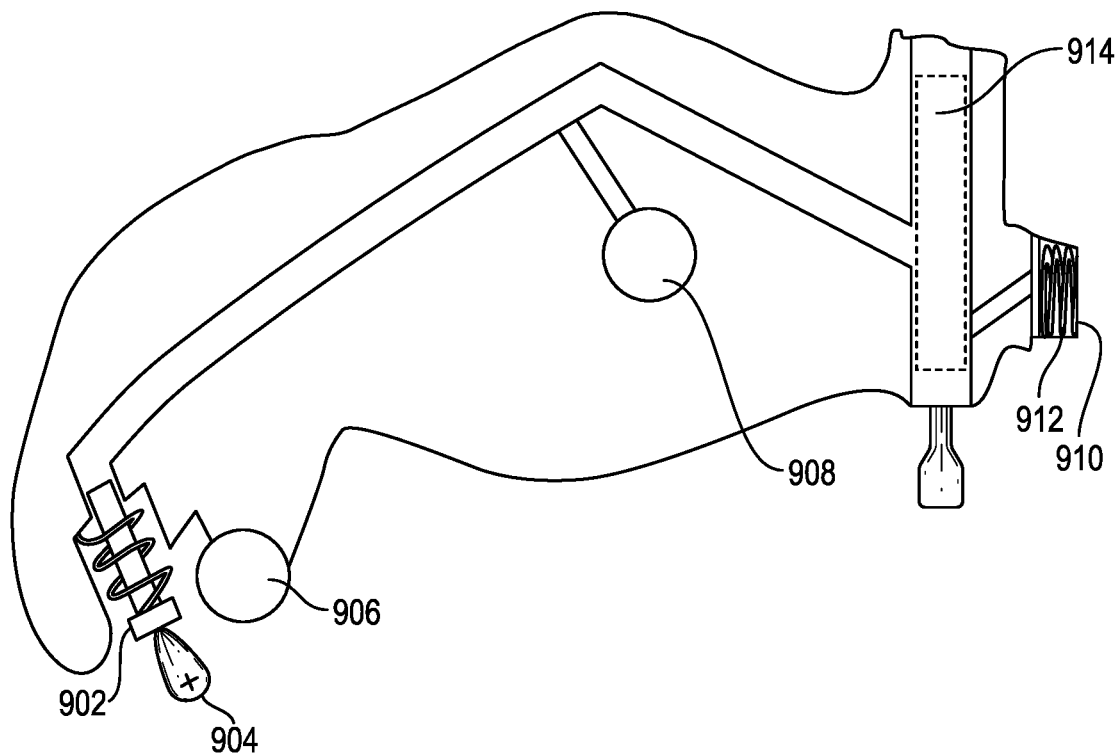
FIG. 13 illustrates a schematic depiction of FIG. 12.

Another potential source for energy waste is that once the lost motion begins for a collapsible CDA element, the oil pressure does not need to be maintained any longer because the CDA element is already unlatched and it may not re-latch until the cam gets back to base circle. FIGS. 12 and 13 show an embodiment that addresses this lost energy such that once the CDA element unlatches and lost motion begins, then a passage to an accumulator 910 is opened and any additional pumping from a pumping tappet 902 puts energy into the accumulator 910, which is restored to the cam lobe on the down-stroke of the rocker. FIG. 13 illustrates the pumping tappet 902 operably connected to a cam lobe 904. The pumping tappet 902 can be incorporated into a main rocker roller lever 906. Oil can be supplied from an oil control valve 908 to an oil passage between pumping tappet 902 and the accumulator 910. The accumulator 910 may have a spring 912 therein to restore the pumping energy. Between the pumping tappet 902/oil control valve 908 and the accumulator 910 is a collapsible CDA element 914. The oil flow passage between the CDA element 914 and the accumulator 910 could be set so the feed of oil pressurized by pumping tappet 902 to the accumulator 910 only opens up once lost motion starts in the CDA element 914.

Figure 9:
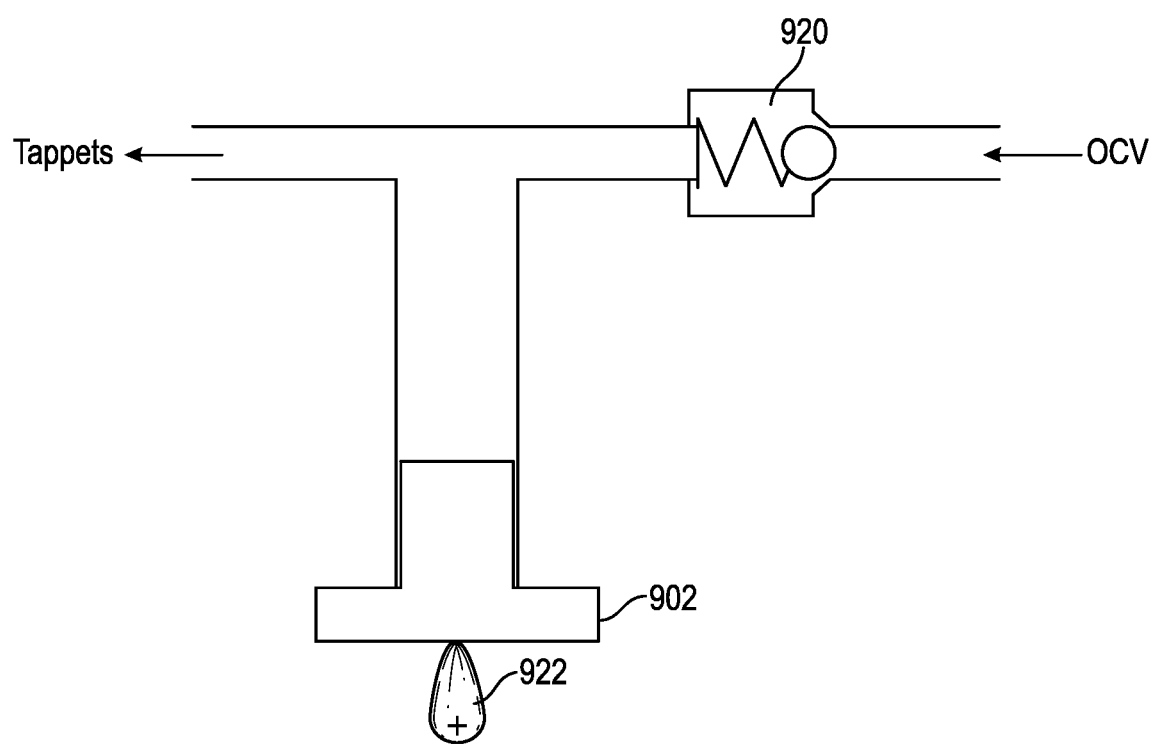
FIG. 9 illustrates a check valve of a part of another embodiment lube system of an internal combustion engine.
Figure 10:
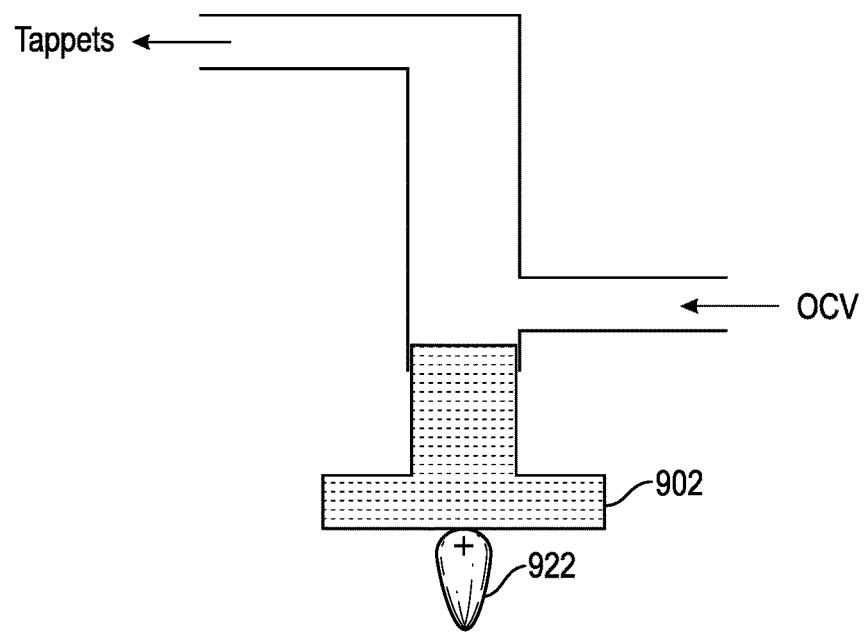
FIG. 10 illustrates another embodiment of FIG. 9 with the flow path open.
Figure 11:
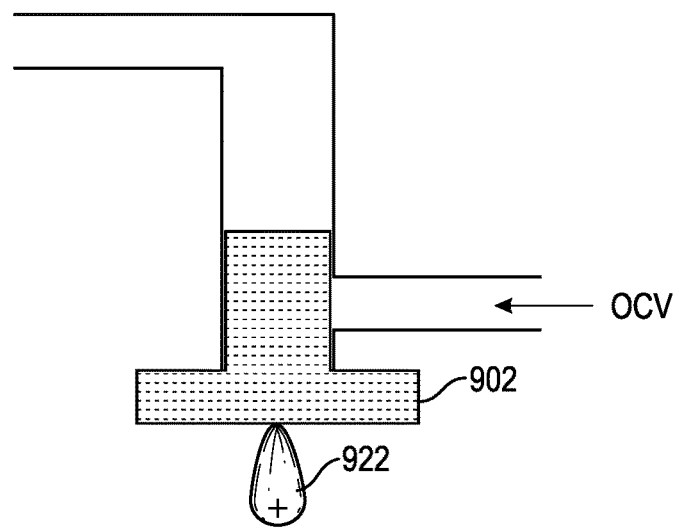
FIG. 11 illustrates the embodiment of FIG. 10 with the flow path closed.

Yet another embodiment includes a pumping cam lobe design that can be employed to actuate pumping tappet 902 to provide a pumping chamber to maintain or increase oil pressure to the valve train components, such as the tappets, in response to a low engine speed or other low oil pressure condition. FIG. 9 illustrates a check valve 920 that prevents back flow to the oil control valve (OCV) so that all the oil pressure rise from pumping tappet 902 created by the pumping cam lobe 922 is transferred to the switching element for the tappets. In this embodiment, it is not desirable that the oil pressure is increased when the CDA is off, so the pumping cam lobe 922 can be switched to a base circle profile during such conditions. FIGS. 10 and 11 illustrate a variation of FIG. 9 such that the check valve 920 is eliminated and fluid is drawn from the OCV as shown in FIG. 10. In FIG. 10 the pumping tappet 902 is positioned by the pumping cam lobe 922 so the oil circuit downstream from the OCV is open, and the oil is drawn in and supplied to the valvetrain components/tappets from the OCV under nominal operating pressures. FIG. 11 illustrates the pumping tappet 902 positioned by the cam lobe 922 so that oil circuit upstream of the OCV is obstructed or temporarily isolated, and the oil downstream of the OCV is pressurized by the pumping tappet 902 for supply to the tappets, increasing or maintaining the pressure of the oil supplied to the tappets during low engine speeds or other low oil pressure conditions.

Yet other embodiments include systems that do not rely on hydraulics such as an electromagnetic system. In one example, the deactivation element is electromagnetic. Another embodiment of the deactivation element includes a pure mechanical device, i.e., latches with a linear motor, and no electronic control.

As is evident from the figures and text presented above, a variety of aspects of the present invention are contemplated. According to one aspect, an oil lube system for an internal combustion engine, comprising: an oil pump fluidly connected to an oil source, wherein the oil pump is operable to output a flow of oil under pressure; a cylinder block fluidly connected to the oil pump to receive a first part of the flow of oil; a cylinder head fluidly connected to the oil pump to receive a second part of the flow of oil, wherein the second part of the flow of oil bypasses the cylinder block; and a valvetrain fluidly connected to receive a portion of the second part of the flow of oil from the cylinder head, wherein the valvetrain is configured to deactivate or skipfire one or more cylinders of the cylinder block.

In one form of the first aspect, further comprising an oil cooler and an oil filter in a flow path between the oil pump and the cylinder block, and wherein the second part of the flow of oil bypasses at least one of the oil cooler and the oil filter.

In one form of the first aspect, the cylinder head is fluidly isolated from the cylinder block.

According to a second aspect, an oil lube system for an internal combustion engine, comprising: an oil pump fluidly connected to an oil source, wherein the oil pump is operable to output a flow of oil under pressure; a cylinder block fluidly connected to the oil pump to receive the flow of oil; a cylinder head fluidly connected to receive a first part of the flow of oil from the cylinder block; and a valvetrain fluidly connected to receive a second part of the flow of oil from the cylinder head, wherein the valvetrain is configured to deactivate or skipfire one or more cylinders of the cylinder block, and wherein at least one of the valvetrain and the cylinder block includes one or more components that are replaced with bearings having reduced lubrication requirements.

In one form of the second aspect, the one or more replaced components include camshaft bearings of the valvetrain.

According to a third aspect, an oil lube system for an internal combustion engine, comprising: an electric oil pump fluidly connected to an oil source, wherein the electric oil pump is operable to output a flow of oil under pressure independently of a speed of the internal combustion engine; a cylinder block fluidly connected to the oil pump to receive the flow of oil; a cylinder head fluidly connected to receive a first part of the flow of oil from the cylinder block; and a valvetrain fluidly connected to receive a second part of the flow of oil from the cylinder head, wherein the valvetrain is configured to deactivate or skipfire one or more cylinders of the cylinder block.

According to a fourth aspect, an oil lube system for an internal combustion engine, comprising: a variable flow oil pump fluidly connected to an oil source, wherein the variable flow oil pump is operable to output a flow of oil under pressure, wherein a displacement of the variable flow oil pump is increased at engine speeds lower than a first speed threshold and the displacement is decreased at engine speeds above a second speed threshold; a cylinder block fluidly connected to the oil pump to receive the flow of oil; a cylinder head fluidly connected to receive a first part of the flow of oil from the cylinder block; and a valvetrain fluidly connected to receive a second part of the flow of oil from the cylinder head, wherein the valvetrain is configured to deactivate or skipfire one or more cylinders of the cylinder block.

In one form of the fourth aspect, wherein the displacement of the variable flow oil pump is controlled in response to a number of cylinders that are firing.

In one form of the fourth aspect, wherein the displacement of the variable flow oil pump is controlled in response to a target output oil pressure.

In one form of the fourth aspect, wherein the target output oil pressure is based on a number of cylinders that are firing.

According to a fifth aspect, an oil lube system for an internal combustion engine, comprising: an oil pump fluidly connected to an oil source, wherein the oil pump is operable to output a flow of oil under pressure; a cylinder block fluidly connected to the oil pump to receive the flow of oil; a cylinder head fluidly connected to receive a first part of the flow of oil from the cylinder block, wherein the cylinder block includes a number of piston cooling nozzles, and at least one of the number of piston cooling nozzles includes a flow control valve to reduce an oil flow through the piston cooling nozzle in response to an oil pressure that is below a threshold; and a valvetrain fluidly connected to receive a second part of the flow of oil from the cylinder head, wherein the valvetrain is configured to deactivate or skipfire one or more cylinders of the cylinder block.

In one form of the fifth aspect, wherein the oil pressure varies directly with a speed of the internal combustion engine.

According to a sixth aspect, an oil lube system for an internal combustion engine, comprising: an oil pump fluidly connected to an oil source, wherein the oil pump is operable to output a flow of oil under pressure; a cylinder block fluidly connected to the oil pump to receive the flow of oil; a cylinder head fluidly connected to receive a first part of the flow of oil from the cylinder block, wherein the cylinder block includes a number of piston cooling nozzles, and at least one of the number of piston cooling nozzles includes a flow control valve operable to reduce an oil flow through the piston cooling nozzle in response to an oil pressure that is below a threshold; and a valvetrain fluidly connected to receive a second part of the flow of oil from the cylinder head, wherein the valvetrain is configured to deactivate or skipfire one or more cylinders of the cylinder block.

In one form of the sixth aspect, wherein the flow control valve is operable to shut off oil flow through the piston cooling nozzle.

In another form of the sixth aspect, wherein each of the piston cooling nozzles includes a flow control valve, and the oil flow from each piston cooling nozzle is shut off in response to cylinder deactivation or skipfire during a low engine speed/load condition.

In one form of the sixth aspect, wherein each of the piston cooling nozzles includes a flow control valve, and an average oil flow from each piston cooling nozzle is reduced by the respective flow control valve in response to cylinder deactivation or skipfire during a low engine speed/load condition.

In yet another form of the sixth aspect, wherein the flow control valve is operable to divert oil flow from the piston cooling nozzle to the valvetrain in response to cylinder deactivation or skipfire during a low engine speed/load condition.

According to a seventh aspect, an oil lube system for an internal combustion engine, comprising: an oil pump fluidly connected to an oil source, wherein the oil pump is operable to output a flow of oil under pressure independently of a speed of the internal combustion engine; a cylinder block fluidly connected to the oil pump to receive the flow of oil; a cylinder head fluidly connected to receive a first part of the flow of oil from the cylinder block; a valvetrain fluidly connected to receive a second part of the flow of oil from the cylinder head, wherein the valvetrain is configured to deactivate or skipfire one or more cylinders of the cylinder block; and a booster oil pump that is operable to receive oil from the oil pump and supply pressurize oil directly to the valvetrain.

In one form of the seventh aspect, wherein the booster oil pump is an electric oil pump.

In an eighth aspect, a method for operating any of the previous aspects or systems, comprising: maintaining or increasing an oil pressure in the valvetrain in response to a cylinder deactivation and/or skipfire mode of operation of the internal combustion engine.

In a ninth aspect, an oil lube system for an internal combustion engine, comprising: an oil pump fluidly connected to an oil source, wherein the oil pump is operable to output a flow of oil under pressure; a cylinder block fluidly connected to the oil pump to receive the flow of oil; a cylinder head fluidly connected to the oil pump to receive the flow of oil; and a valvetrain fluidly connected to receive the flow of oil from the cylinder head, wherein the valvetrain is configured to deactivate or skipfire one or more cylinders of the cylinder block to maintain or increase an oil pressure in the valvetrain in response to the cylinder deactivation and/or skipfire.

In a tenth aspect, an oil lube system for an internal combustion engine, comprising: an oil circuit configured to circulate a flow of oil under pressure; a cylinder block fluidly connected to receive the flow of oil; a cylinder head fluidly connected to receive the flow of oil; and a valvetrain fluidly connected to receive the flow of oil from the cylinder head, wherein the valvetrain includes a pumping tappet fluidly connected to the oil circuit and a pumping cam lobe connected to the pumping tappet, wherein the pumping tappet is actuated by the cam lobe to maintain or increase an oil pressure to the valvetrain.

In one form of the tenth aspect, wherein the pumping tappet is actuated by the pumping cam lobe from a first position in which the oil circuit is fluidly connected to the valvetrain to a second position in which the oil circuit upstream of the pumping tappet is obstructed by the pumping tappet as the pumping tappet maintains or increases the oil pressure to the valvetrain.

In a second form of the tenth aspect, wherein the oil circuit includes a check valve to prevent the pumping tappet from pressurizing oil in the oil circuit upstream of the valvetrain.

In an eleventh aspect, an oil lube system for an internal combustion engine, comprising: an oil circuit configured to circulate a flow of oil under pressure; a cylinder block fluidly connected to receive the flow of oil; a cylinder head fluidly connected to receive the flow of oil; and a valvetrain fluidly connected to receive the flow of oil from the cylinder head, the valvetrain including at least one tappet operably connected to at least one cam lobe, wherein the at least one tappet is actuated by the at least one cam lobe to maintain or increase an oil pressure in the valvetrain in response to a cylinder deactivation and/or skipfire event.

In one aspect of the eleventh aspect, further comprising: an accumulator fluidly connected to the at least one tappet in the oil circuit, wherein actuation of the at least one tappet with the cam lobe provides pressurized oil to the accumulator.

In a second aspect of the eleventh aspect, further comprising: a collapsible cylinder activation element positioned between the at least one tappet and the accumulator that collapses during lost motion, wherein an oil flow passage to the accumulator is opened only during lost motion of the collapsible cylinder deactivation element.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed i:

1. An oil lube system for an internal combustion engine, comprising:
   an oil pump fluidly connected to an oil source, wherein the oil pump is operable to output a flow of oil under pressure;
   a cylinder block fluidly connected to the oil pump to receive a first part of the flow of oil;
   a cylinder head fluidly connected to the oil pump to receive a second part of the flow of oil, wherein the second part of the flow of oil bypasses the cylinder block to flow directly to the cylinder head; and
   a valvetrain fluidly connected to receive a portion of the second part of the flow of oil from the cylinder head, wherein the valvetrain is configured to deactivate or skipfire one or more cylinders of the cylinder block.

2. The system of claim 1, further comprising:
   an oil cooler and an oil filter in a flow path between the oil pump and the cylinder block, and wherein the second part of the flow of oil bypasses at least one of the oil cooler and the oil filter.

3. The system of claim 1, wherein the cylinder head is fluidly isolated from the cylinder block.

4. An oil lube system for an internal combustion engine, comprising:
   an oil pump fluidly connected to an oil source, wherein the oil pump is operable to output a flow of oil under pressure;
   a cylinder block fluidly connected to the oil pump to receive the flow of oil;
   a cylinder head fluidly connected to receive a first part of the flow of oil from the cylinder block; and
   a valvetrain fluidly connected to receive a second part of the flow of oil from the cylinder head, wherein the second part of the flow of oil bypasses the cylinder block to flow directly to the cylinder head, wherein the valvetrain is configured to deactivate or skipfire one or more cylinders of the cylinder block, and wherein at least one of the valvetrain and the cylinder block includes one or more components that are replaced with bearings having reduced lubrication requirements.

5. The system of claim 4, wherein the one or more replaced components include camshaft bearings of the valvetrain.

6. An oil lube system for an internal combustion engine, comprising:
- an electric oil pump fluidly connected to an oil source, wherein the electric oil pump is operable to output a flow of oil under pressure independently of a speed of the internal combustion engine;
- a cylinder block fluidly connected to the oil pump to receive the flow of oil;
- a cylinder head fluidly connected to receive a first part of the flow of oil from the cylinder block; and
- a valvetrain fluidly connected to receive a second part of the flow of oil from the cylinder head, wherein the second part of the flow of oil bypasses the cylinder block to flow directly to the cylinder head, wherein the valvetrain is configured to deactivate or skipfire one or more cylinders of the cylinder block.

7. An oil lube system for an internal combustion engine, comprising:
- a variable flow oil pump fluidly connected to an oil source, wherein the variable flow oil pump is operable to output a flow of oil under pressure, wherein a displacement of the variable flow oil pump is increased at engine speeds lower than a first speed threshold and the displacement is decreased at engine speeds above a second speed threshold;
- a cylinder block fluidly connected to the oil pump to receive the flow of oil;
- a cylinder head fluidly connected to receive a first part of the flow of oil from the cylinder block; and
- a valvetrain fluidly connected to receive a second part of the flow of oil from the cylinder head, wherein the second part of the flow of oil bypasses the cylinder block to flow directly to the cylinder head, wherein the valvetrain is configured to deactivate or skipfire one or more cylinders of the cylinder block.

8. The system of claim 7, wherein the displacement of the variable flow oil pump is controlled in response to a number of cylinders that are firing.

9. The system of claim 7, wherein the displacement of the variable flow oil pump is controlled in response to a target output oil pressure.

10. The system of claim 9, wherein the target output oil pressure is based on a number of cylinders that are firing.

11. An oil lube system for an internal combustion engine, comprising:
- an oil pump fluidly connected to an oil source, wherein the oil pump is operable to output a flow of oil under pressure;
- a cylinder block fluidly connected to the oil pump to receive the flow of oil;
- a cylinder head fluidly connected to receive a first part of the flow of oil from the cylinder block, wherein the cylinder block includes a number of piston cooling nozzles, and at least one of the number of piston cooling nozzles includes a flow control valve to reduce an oil flow through the piston cooling nozzle in response to an oil pressure that is below a threshold; and
- a valvetrain fluidly connected to receive a second part of the flow of oil from the cylinder head, wherein the second part of the flow of oil bypasses the cylinder block to flow directly to the cylinder head, wherein the valvetrain is configured to deactivate or skipfire one or more cylinders of the cylinder block.

12. The system of claim 11, wherein the oil pressure varies directly with a speed of the internal combustion engine.

13. An oil lube system for an internal combustion engine, comprising:
- an oil pump fluidly connected to an oil source, wherein the oil pump is operable to output a flow of oil under pressure;
- a cylinder block fluidly connected to the oil pump to receive the flow of oil;
- a cylinder head fluidly connected to receive a first part of the flow of oil from the cylinder block, wherein the cylinder block includes a number of piston cooling nozzles, and at least one of the number of piston cooling nozzles includes a flow control valve operable to reduce an oil flow through the piston cooling nozzle in response to an oil pressure that is below a threshold; and
- a valvetrain fluidly connected to receive a second part of the flow of oil from the cylinder head, wherein the second part of the flow of oil bypasses the cylinder block to flow directly to the cylinder head, wherein the valvetrain is configured to deactivate or skipfire one or more cylinders of the cylinder block.

14. The system of claim 13, wherein the flow control valve is operable to shut off oil flow through the piston cooling nozzle.

15. The system of claim 13, wherein each of the piston cooling nozzles includes a flow control valve, and the oil flow from each piston cooling nozzle is shut off in response to cylinder deactivation or skipfire during a low engine speed/load condition.

16. The system of claim 13, wherein each of the piston cooling nozzles includes a flow control valve, and an average oil flow from each piston cooling nozzle is reduced by the respective flow control valve in response to cylinder deactivation or skipfire during a low engine speed/load condition.

17. The system of claim 13, wherein the flow control valve is operable to divert oil flow from the piston cooling nozzle to the valvetrain in response to cylinder deactivation or skipfire during a low engine speed/load condition.

18. An oil lube system for an internal combustion engine, comprising:
- an oil pump fluidly connected to an oil source, wherein the oil pump is operable to output a flow of oil under pressure independently of a speed of the internal combustion engine;
- a cylinder block fluidly connected to the oil pump to receive the flow of oil;
- a cylinder head fluidly connected to receive a first part of the flow of oil from the cylinder block;
- a valvetrain fluidly connected to receive a second part of the flow of oil from the cylinder head, wherein the second part of the flow of oil bypasses the cylinder block to flow directly to the cylinder head, wherein the valvetrain is configured to deactivate or skipfire one or more cylinders of the cylinder block; and
- a booster oil pump that is operable to receive oil from the oil pump and supply pressurize oil directly to the valvetrain.

19. The system of claim 18, wherein the booster oil pump is an electric oil pump.

20. An oil lube system for an internal combustion engine, comprising:
- an oil pump fluidly connected to an oil source, wherein the oil pump is operable to output a flow of oil under pressure;
- a cylinder block fluidly connected to the oil pump to receive the flow of oil;

a cylinder head fluidly connected to the oil pump to receive the flow of oil; and a valvetrain fluidly connected to receive the flow of oil from the cylinder head, wherein the valvetrain is configured to deactivate or skipfire one or more cylinders of the cylinder block to increase an oil pressure in the valvetrain in response to the cylinder deactivation and/or skipfire.

21. An oil lube system for an internal combustion engine, comprising:

an oil circuit configured to circulate a flow of oil under pressure;

a cylinder block fluidly connected to receive the flow of oil;

a cylinder head fluidly connected to receive the flow of oil; and a valvetrain fluidly connected to receive the flow of oil from the cylinder head, wherein the valvetrain includes a pumping tappet fluidly connected to the oil circuit and a pumping cam lobe connected to the pumping tappet, wherein the pumping tappet is actuated by the cam lobe to maintain or increase an oil pressure to the valvetrain, wherein the pumping tappet is actuated by the pumping cam lobe from a first position in which the oil circuit is fluidly connected to the valvetrain to a second position in which the oil circuit upstream of the pumping tappet is obstructed by the pumping tappet as the pumping tappet maintains or increases the oil pressure to the valvetrain.

22. The system of claim 21, wherein the oil circuit includes a check valve to prevent the pumping tappet from pressurizing oil in the oil circuit upstream of the valvetrain.

23. An oil lube system for an internal combustion engine, comprising:

an oil circuit configured to circulate a flow of oil under pressure;

a cylinder block fluidly connected to receive the flow of oil;

a cylinder head fluidly connected to receive the flow of oil;

a valvetrain fluidly connected to receive the flow of oil from the cylinder head, the valvetrain including at least one tappet operably connected to at least one cam lobe, wherein the at least one tappet is actuated by the at least one cam lobe to maintain or increase an oil pressure in the valvetrain in response to a cylinder deactivation and/or skipfire event; and an accumulator fluidly connected to the at least one tappet in the oil circuit, wherein actuation of the at least one tappet with the cam lobe provides pressurized oil to the accumulator.

24. The system of claim 23, further comprising:

a collapsible cylinder deactivation element positioned between the at least one tappet and the accumulator that collapses during lost motion, wherein an oil flow passage to the accumulator is opened only during lost motion of the collapsible cylinder deactivation element.

* * * * *